United States Patent
Hoydis et al.

(10) Patent No.: US 11,082,149 B2
(45) Date of Patent: Aug. 3, 2021

(54) COMMUNICATION SYSTEM HAVING A CONFIGURABLE MODULATION ORDER AND AN ASSOCIATED METHOD AND APPARATUS

(71) Applicant: NOKIA TECHNOLOGIES OY, Espoo (FI)

(72) Inventors: Jakob Hoydis, Paris (FR); Faycal Ait Aoudia, Saint-Cloud (FR); Mathieu Goutay, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/905,569

(22) Filed: Jun. 18, 2020

(65) Prior Publication Data
US 2020/0403723 A1 Dec. 24, 2020

(30) Foreign Application Priority Data
Jun. 20, 2019 (FI) .................................... 20195547

(51) Int. Cl.
- *H04L 1/00* (2006.01)
- *G06N 3/02* (2006.01)
- *H04L 5/00* (2006.01)

(52) U.S. Cl.
CPC ............ *H04L 1/0003* (2013.01); *G06N 3/02* (2013.01); *H04L 1/0009* (2013.01); *H04L 1/0026* (2013.01); *H04L 5/0044* (2013.01)

(58) Field of Classification Search
CPC ... H04L 1/0003; H04L 1/0026; H04L 5/0048; H04L 1/0009; H04L 5/0073;
(Continued)

(56) References Cited

U.S. PATENT DOCUMENTS

| | | | |
|---|---|---|---|
| 10,003,483 B1 | 6/2018 | Migliori et al. | |
| 2010/0211842 A1* | 8/2010 | Moon | H04L 1/08 714/748 |

(Continued)

FOREIGN PATENT DOCUMENTS

| | | |
|---|---|---|
| CN | 108460457 A | 8/2018 |
| EP | 3 418 948 A1 | 12/2018 |

(Continued)

OTHER PUBLICATIONS

Office Action for Finnish Application No. 20195547 dated Oct. 25, 2019, 9 pages.
(Continued)

*Primary Examiner* — Khanh C Tran
(74) *Attorney, Agent, or Firm* — Alston & Bird LLP

(57) ABSTRACT

A method, apparatus, receiver and system provide for configurability of the modulation order of a communications system, such as an autoencoder-based communication system. With respect to a system including a transmitter and a receiver, the transmitter encodes a message into a vector of channel symbols for transmission via a channel. The message is encoded pursuant to a modulation order m that is adjustable up to a maximum modulation order $M_{max}$. The receiver receives a vector of samples generated by the channel and determines a first prediction vector for the message encoded by the transmitter. The receiver includes a slicing layer to eliminate one or more elements of the first prediction vector if the modulation order m is less than the maximum modulation order $M_{max}$ so as to generate a second prediction vector tailored to the modulation order from which a prediction of the message encoded by the transmitter is identified.

28 Claims, 6 Drawing Sheets

(58) Field of Classification Search
CPC ... H04L 1/0017; H04L 1/0038; H04L 5/0035; H04L 5/006; H04L 5/0044; H04W 72/082; H04W 24/08; H04B 7/0456; H04B 7/0626; H04J 11/004; H04J 11/0023; G06N 3/02
See application file for complete search history.

(56) References Cited

U.S. PATENT DOCUMENTS

| | | | |
|---|---|---|---|
| 2014/0269663 A1* | 9/2014 | Nikopour | H04B 1/707 370/342 |
| 2015/0127327 A1 | 5/2015 | Bacchiani et al. | |
| 2015/0188568 A1* | 7/2015 | Myung | H03M 13/1171 714/752 |
| 2016/0021565 A1* | 1/2016 | Kim | H04B 17/345 370/329 |
| 2016/0135194 A1* | 5/2016 | Kim | H04L 1/0026 370/329 |
| 2016/0307072 A1 | 10/2016 | Zhou et al. | |
| 2017/0188371 A1* | 6/2017 | Kim | H04W 52/243 |
| 2017/0257206 A1* | 9/2017 | Schmitt | H04L 5/0094 |
| 2018/0232574 A1 | 8/2018 | Farsad et al. | |
| 2021/0013995 A1* | 1/2021 | Chen | H04L 1/0026 |

FOREIGN PATENT DOCUMENTS

| | | |
|---|---|---|
| WO | WO 2018/193018 A1 | 10/2018 |
| WO | WO 2018/233932 A1 | 12/2018 |
| WO | WO 2018/234084 A1 | 12/2018 |
| WO | WO 2019/080987 A1 | 5/2019 |
| WO | WO 2019/080988 A1 | 5/2019 |
| WO | WO 2019/135019 A1 | 7/2019 |
| WO | WO 2019/193377 A1 | 10/2019 |
| WO | WO 2019/193380 A1 | 10/2019 |

OTHER PUBLICATIONS

Afan, A. et al., *Automatic Modulation Classification of Digital Modulation Signals With Stacked Autoencoders*, Digital Signal Processing, 71 (2017) 108-116.

Ali, A. et al., *Automatic Modulation Classification Using Deep Learning Based on Sparse Autoencoders With Nonnegativity Constraints*, IEE Signal Processing Letters, vol. 24, No. 11 (Nov. 2017) 1626-1630.

Ambaw, B. A. et al., *A Case for Stacked Autoencoder Based Order Recognition of Continuous-Phase FSK*, IEEE (2017) 6 pages.

Bouchou, M. et al., *Automatic Digital Modulation Recognition Based on Stacked Sparse Autoencoder*, 2017 17$^{th}$ IEEE International Conference on Communication Technology, (2017) 28-32.

Jones, R. T. et al., *Deep Learning of Geometric Constellation Shaping Including Fiber Nonlinearities*, arXiv:1805.03785v1 (May 10, 2018) 3 pages.

O'Shea, T. et al., *An Introduction to Deep Learning for the Physical Layer*, IEEE Transactions on Cognitive Communications and Networking, vol. 3, No. 4 (Dec. 2017) 563-575.

Wang, T. et al., *Deep Learning for Wireless Physical Layer: Opportunities and Challenges*, China Communications (Nov. 2017) 92-111.

Office Action for German Patent Application No. 10 2020 116 075.5 dated Mar. 22, 2021, 9 pages.

\* cited by examiner

COMMUNICATION SYSTEM HAVING A CONFIGURABLE MODULATION ORDER AND AN ASSOCIATED METHOD AND APPARATUS

CROSS-REFERENCE TO RELATED APPLICATIONS

This application claims priority to Finnish Application No. 20195547, filed Jun. 20, 2019, the entire contents of which are incorporated herein by reference.

TECHNOLOGICAL FIELD

An example embodiment relates generally to communication systems, and, more particularly, to communication systems having a configurable modulation order and to methods and apparatuses for training both a transmitter and a receiver of such a communication system so as to provide for the configurable modulation order.

BACKGROUND

In communication systems, such as autoencoder-based communication systems, data of various types is commonly transmitted by a transmitter through a communications channel to a receiver, which endeavors to reconstruct the signal transmitted by the transmitter. In this regard, the transmitter generally encodes a message s drawn from a finite discrete set of possible messages. The transmitter encodes the message s into a finite-length vector x of channel symbols for transmission via a channel to the receiver. During propagation through the channel, the vector x of channel symbols is subjected to distortion, such as noise, such that the receiver receives a finite-length vector y of samples, which generally differs from the vector x of channel symbols transmitted by the transmitter as a result of the distortion introduced by the channel. Based upon the vector y of samples received by the receiver, the receiver generates a prediction $\hat{s}$ of the message encoded and subsequently transmitted by the transmitter.

Autoencoder-based communication systems have a modulation order that defines the number of constellation points. The modulation order of an autoencoder-based communication system defines the number of possible messages that the transmitter can generate and the receiver can decode. For example, an autoencoder-based communication system configured to transmit messages in accordance with classical quadrature phase shift keying (QPSK) modulation would be designed to have a modulation order of four such that the transmitter can encode and the receiver can decode the four different messages transmitted in accordance with QPSK modulation. As another example, an autoencoder-based communication system that is designed to transmit and receive messages subjected to 16QAM (quadrature amplitude modulation) would have a modulation order of 16 as there are 16 different messages that the transmitter can generate and the receiver can decode.

Unlike the channel that is generally represented as one or more non-trainable layers between the transmitter and the receiver that are configured to generate y~Pr(y|x), the transmitter and receiver may include neural networks that may be trained in order to appropriately encode and decode a message. In this regard, the input layer of the transmitter and the output layer of the receiver of an autoencoder-based communication system may be neural networks that have a number of units corresponding to the modulation order as a result of the training of the neural networks for a fixed number of possible messages. As a result, an autoencoder-based communication system typically has a fixed modulation order.

In an instance in which messages are to be generated and transmitted with a different modulation order than the modulation order that an autoencoder-based communication system is designed to support, a different autoencoder-based communication system would have to be trained and utilized to support the different modulation order. In some systems, such as those that employ link adaptation algorithms, there is a desire to change the modulation order during operation of an autoencoder-based communication system, such as a result of a change the channel state. As a result of the design of an autoencoder-based communication system to support a fixed modulation order, a change in the modulation order generally requires the training and utilization of a different autoencoder-based communication system, thereby potentially increasing the costs and technical complexities associated with the use of autoencoder-based communication systems in situations in which the modulation order may change during operation.

BRIEF SUMMARY

A method, apparatus, receiver and system are disclosed for providing for configurability of the modulation order of a communications system, such as an autoencoder-based communication system. In this regard, the transmitter and receiver of the communication system may be trained in conjunction with a plurality of different modulation orders. As such, the modulation order of the same communication system may be reconfigured at run time without having train and utilize a different communication system to support the different modulation order. By allowing for the configurability of the modulation order of a communication system, such as an autoencoder-based communication system, the resulting communication system may be more readily and efficiently utilized in a variety of additional applications including those in which the modulation order is adapted during operation, such as due to changing channel conditions.

In an example embodiment, a system is provided that includes a transmitter configured to encode a message into a vector of channel symbols for transmission via a channel. The transmitter is configured to encode the message in accordance with a modulation order m that is adjustable up to a maximum modulation order $M_{max}$. The system also includes a receiver configured to receive a vector of samples generated by the channel in response to the vector of channel symbols transmitted by the transmitter. The receiver is configured to determine a first prediction vector for the message encoded by the transmitter. The receiver includes a slicing layer configured to eliminate one or more elements of the first prediction vector in an instance in which the modulation order m is less than the maximum modulation order $M_{max}$ so as to generate a second prediction vector tailored to the modulation order from which a prediction of the message encoded by the transmitter is identified.

The receiver of an example embodiment is further configured to generate a probability vector associated with the modulation order m. The probability vector assigns probabilities for m-possible messages based upon the second prediction vector. The system of this example embodiment further includes at least one processor configured to determine one or more updated parameters of the receiver and of the transmitter. The updated parameters of the receiver and of the transmitter are based on the probability vector for each of a plurality of modulation orders. In this example embodiment, the transmitter and receiver are reconfigured based upon the one or more updated parameters of the transmitter and receiver, respectively. The receiver of an example embodiment further includes an activation function configured to normalize the second prediction vector into the probability vector representing a probability distribution having m probabilities. In an example embodiment, at least one of the transmitter or the receiver includes a neural network having a plurality of trainable parameters that are updated by determinations of the at least one processor.

The transmitter of an example embodiment is configured to encode a message and the receiver is configured to predict the message encoded by the transmitter in accordance with a plurality of modulation orders. In this regard, a respective modulation order defines a number of different messages capable of being encoded by the transmitter and predicted by the receiver. The transmitter of an example embodiment is configured to encode the message as an $M_{max}$-dimensional vector having an element that corresponds to the message being encoded set to a first value and all other elements set to a second value, different than the first value. In this example embodiment in which the transmitter is configured to encode a message and the receiver is configured to predict the message encoded by the transmitter in accordance with a respective modulation order m, only elements 1, 2, ... m of the $M_{max}$-dimensional vector are able to be set to the first value, with elements m+1, m+2, ... $M_{max}$ of the $M_{max}$-dimensional vector being set to the second value.

The slicing layer of the receiver of an example embodiment is configured to eliminate elements of the first prediction vector such that the second prediction vector has a number of elements that equals the modulation order. In an example embodiment, the slicing layer of the receiver has a variable width that is dependent upon the modulation order. The width of the slicing layer defines a number of elements of the second prediction vector. The transmitter of an example embodiment is further configured to change the modulation order based upon feedback provided by the receiver. Additionally or alternatively, the transmitter is further configured to provide a message to the receiver to inform the receiver of the modulation order.

In another example embodiment, a receiver is provided that includes a communication interface configured to receive a vector of samples generated by a channel in response to a vector of channel symbols transmitted by a transmitter. The receiver also includes at least one processor configured to determine a first prediction vector for a message encoded by the transmitter into the vector of channel symbols in accordance with a modulation order m that is adjustable up to a maximum modulation order $M_{max}$. The at least one processor includes a slicing layer configured to eliminate one or more elements of the first prediction vector in an instance in which the modulation order m is less than the maximum modulation order $M_{max}$ so as to generate a second prediction vector tailored to the modulation order from which a prediction of the message encoded by the transmitter is identified.

The at least one processor of an example embodiment is further configured to generate a probability vector associated with the modulation order m. The probability vector assigns probabilities for m-possible messages based upon the second prediction vector. The at least one processor is further configured to determine one or more updated parameters of the receiver. The updated parameters of the receiver are based on the probability vector for each of a plurality of modulation orders. The receiver of this example embodiment is reconfigured based upon the one or more updated parameters. The at least one processor of an example embodiment includes an activation function configured to normalize the second prediction vector into the probability vector representing a probability distribution having m probabilities. In an example embodiment, the at least one processor includes a neural network having a plurality of trainable parameters that are updated by determinations of the at least one processor.

The receiver of an example embodiment is configured to predict the message encoded by the transmitter in accordance with a plurality of modulation orders. A respective modulation order defines a number of different messages capable of being encoded by the transmitter and predicted by the receiver. In an example embodiment, the slicing layer is configured to eliminate elements of the first prediction vector such that the second prediction vector has a number of elements that equals the modulation order. The slicing layer of an example embodiment has a variable width that is dependent upon the modulation order. The width of the slicing layer defines a number of elements of the second prediction vector.

In an example embodiment, an apparatus includes at least one processor and at least one memory including computer program code with the at least one memory and the computer program code configured to, with the at least one processor, cause the apparatus to receive, for a plurality of messages transmitted by a communications system configured to have a plurality of modulation orders, a plurality of probability vectors with each probability vector associated with a respective one of the plurality of modulation orders. The probability vector assigns probabilities to a vector of samples that identifies the probability that a respective message corresponds to the vector of samples. The at least one memory and the computer program code are configured to, with the at least one processor, cause the apparatus to determine one or more updated parameters of a receiver of the communications system that receives the vector of samples generated by a channel in response to a vector of channel symbols transmitted by a transmitter of the communications system. The updated parameters of the receiver are based on the plurality of probability vectors. The at least one memory and the computer program code are also configured to, with the at least one processor, cause the apparatus to determine one or more updated parameters of the transmitter that provides the vector of channel symbols for transmission over the channel. The updated parameters of the transmitter are based on the plurality of probability vectors.

The at least one memory and the computer program code are further configured to, with the at least one processor, cause the apparatus of an example embodiment to repeatedly receive an additional plurality of probability vectors for a different plurality of messages transmitted by the communications system and to repeatedly determine the one or more updated parameters of the receiver and the transmitter based on the additional plurality of probability vectors. The at least one memory and the computer program code are further configured to, with the at least one processor, cause the apparatus of an example embodiment to evaluate a stopping criterion and to continue to repeatedly receive the additional plurality of probability vectors for the different plurality of messages transmitted by the communications system and to repeatedly determine the one or more updated parameters of the receiver and the transmitter based on the additional plurality of probability vectors until the stopping criterion is satisfied.

The at least one memory and the computer program code are further configured to, with the at least one processor, cause the apparatus of an example embodiment to determine a loss function, such as a categorical cross-entropy loss, based on the plurality of probability vectors and to perform a gradient descent on the loss function. The at least one memory and the computer program code are also configured to, with the at least one processor, cause the apparatus of this example embodiment to determine one or more updated parameters of the receiver and the transmitter based on the gradient descent. The modulation order defines a number of different messages capable of being encoded by the transmitter and predicted by the receiver. The plurality of modulation orders define different numbers of messages capable of being encoded by the transmitter and predicted by the receiver.

In another example embodiment, a method is provided that includes receiving, for a plurality of messages transmitted by a communications system configured to have a plurality of modulation orders, a plurality of probability vectors with each probability vector associated with a respective one of the plurality of modulation orders. The probability vector assigns probabilities to a vector of samples that identifies the probability that a respective message corresponds to the vector of samples. The method also includes determining one or more updated parameters of a receiver of the communications system that receives the vector of samples generated by a channel in response to a vector of channel symbols transmitted by a transmitter of the communications system. The updated parameters of the receiver are based on the plurality of probability vectors. The method further includes determining one or more updated parameters of the transmitter that provides the vector of channel symbols for transmission over the channel. The updated parameters of the transmitter are based on the plurality of probability vector.

The method of an example embodiment further includes repeatedly receiving an additional plurality of probability vectors for a different plurality of messages transmitted by the communications system and repeatedly determining the one or more updated parameters of the receiver and the transmitter based on the additional plurality of probability vectors. In an example embodiment, the method includes evaluating a stopping criterion and continuing to repeatedly receive the additional plurality of probability vectors for the different plurality of messages transmitted by the communications system and to repeatedly determine the one or more updated parameters of the receiver and the transmitter based on the additional plurality of probability vectors until the stopping criterion is satisfied.

The method of an example embodiment also includes determining a loss function, such as a categorical cross-entropy loss, based on the plurality of probability vectors and performing a gradient descent on the loss function. The method of this example embodiment further includes determining one or more updated parameters of the receiver and the transmitter by determining one or more updated parameters of the receiver and the transmitter based on the gradient descent. The modulation order defines a number of different messages capable of being encoded by the transmitter and predicted by the receiver. The plurality of modulation orders define different numbers of messages capable of being encoded by the transmitter and predicted by the receiver.

In a further example embodiment, a computer program product is provided that comprises at least one non-transitory computer-readable storage medium having computer executable program code instructions stored therein with the computer executable program code instructions including program code instructions configured, upon execution, to receive, for a plurality of messages transmitted by a communications system configured to have a plurality of modulation orders, a plurality of probability vectors with each probability vector associated with a respective one of the plurality of modulation orders. The probability vector assigns probabilities to a vector of samples that identifies the probability that a respective message corresponds to the vector of samples. The computer executable program code instructions also include program code instructions configured, upon execution, to determine one or more updated parameters of a receiver of the communications system that receives the vector of samples generated by a channel in response to a vector of channel symbols transmitted by a transmitter of the communications system. The updated parameters of the receiver are based on the plurality of probability vectors. The computer executable program code instructions further include program code instructions configured, upon execution, to determine one or more updated parameters of the transmitter that provides the vector of channel symbols for transmission over the channel. The updated parameters of the transmitter are based on the plurality of probability vector.

The computer executable program code instructions of an example embodiment also include program code instructions configured, upon execution, to repeatedly receive an additional plurality of probability vectors for a different plurality of messages transmitted by the communications system and to repeatedly determine the one or more updated parameters of the receiver and the transmitter based on the additional plurality of probability vectors. In an example embodiment, the computer executable program code instructions also include program code instructions configured, upon execution, to evaluate a stopping criterion and to continue to repeatedly receive the additional plurality of probability vectors for the different plurality of messages transmitted by the communications system and to repeatedly determine the one or more updated parameters of the receiver and the transmitter based on the additional plurality of probability vectors until the stopping criterion is satisfied.

The computer executable program code instructions of an example embodiment also include program code instructions configured, upon execution, to determine a loss function, such as a categorical cross-entropy, loss based on the plurality of probability vectors and to perform a gradient descent on the loss function. The computer executable program code instructions of this example embodiment further include program code instructions configured, upon execution, to determine one or more updated parameters of the receiver and the transmitter by determining one or more updated parameters of the receiver and the transmitter based on the gradient descent. The modulation order defines a number of different messages capable of being encoded by the transmitter and predicted by the receiver. The plurality of modulation orders define different numbers of messages capable of being encoded by the transmitter and predicted by the receiver.

In yet another example embodiment, an apparatus is provided that includes means for receiving, for a plurality of messages transmitted by a communications system configured to have a plurality of modulation orders, a plurality of probability vectors with each probability vector associated with a respective one of the plurality of modulation orders. The probability vector assigns probabilities to a vector of samples that identifies the probability that a respective message corresponds to the vector of samples. The apparatus also includes means for determining one or more updated parameters of a receiver of the communications system that receives the vector of samples generated by a channel in response to a vector of channel symbols transmitted by a transmitter of the communications system. The updated parameters of the receiver are based on the plurality of probability vectors. The apparatus further includes means for determining one or more updated parameters of the transmitter that provides the vector of channel symbols for transmission over the channel. The updated parameters of the transmitter are based on the plurality of probability vector.

The apparatus of an example embodiment further includes means for repeatedly receiving an additional plurality of probability vectors for a different plurality of messages transmitted by the communications system and means for repeatedly determining the one or more updated parameters of the receiver and the transmitter based on the additional plurality of probability vectors. In an example embodiment, the apparatus includes means for evaluating a stopping criterion and means for continuing to repeatedly receive the additional plurality of probability vectors for the different plurality of messages transmitted by the communications system and to repeatedly determine the one or more updated parameters of the receiver and the transmitter based on the additional plurality of probability vectors until the stopping criterion is satisfied.

The apparatus of an example embodiment also includes means for determining a loss function, such as a categorical cross-entropy loss, based on the plurality of probability vectors and means for performing a gradient descent on the loss function. The apparatus of this example embodiment further includes means for determining one or more updated parameters of the receiver and the transmitter by determining one or more updated parameters of the receiver and the transmitter based on the gradient descent. The modulation order defines a number of different messages capable of being encoded by the transmitter and predicted by the receiver. The plurality of modulation orders define different numbers of messages capable of being encoded by the transmitter and predicted by the receiver.

BRIEF DESCRIPTION OF THE DRAWINGS

Figure 1:
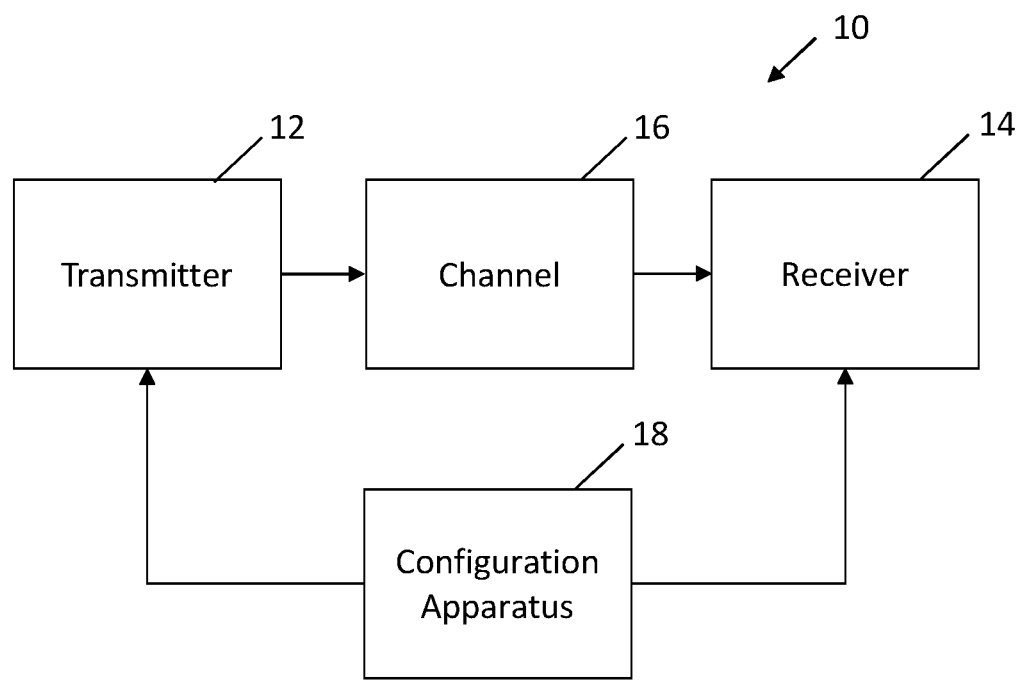
Figure 3:
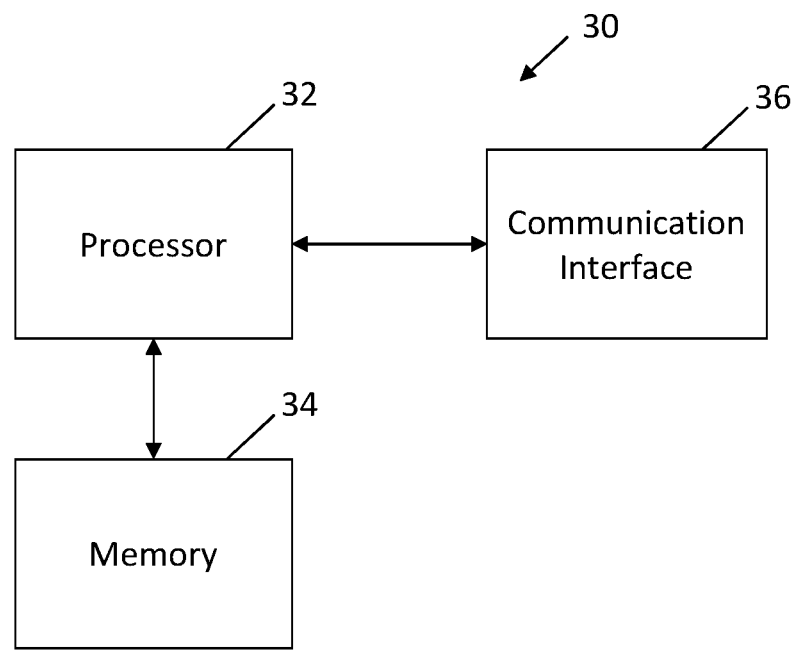
Figure 2:
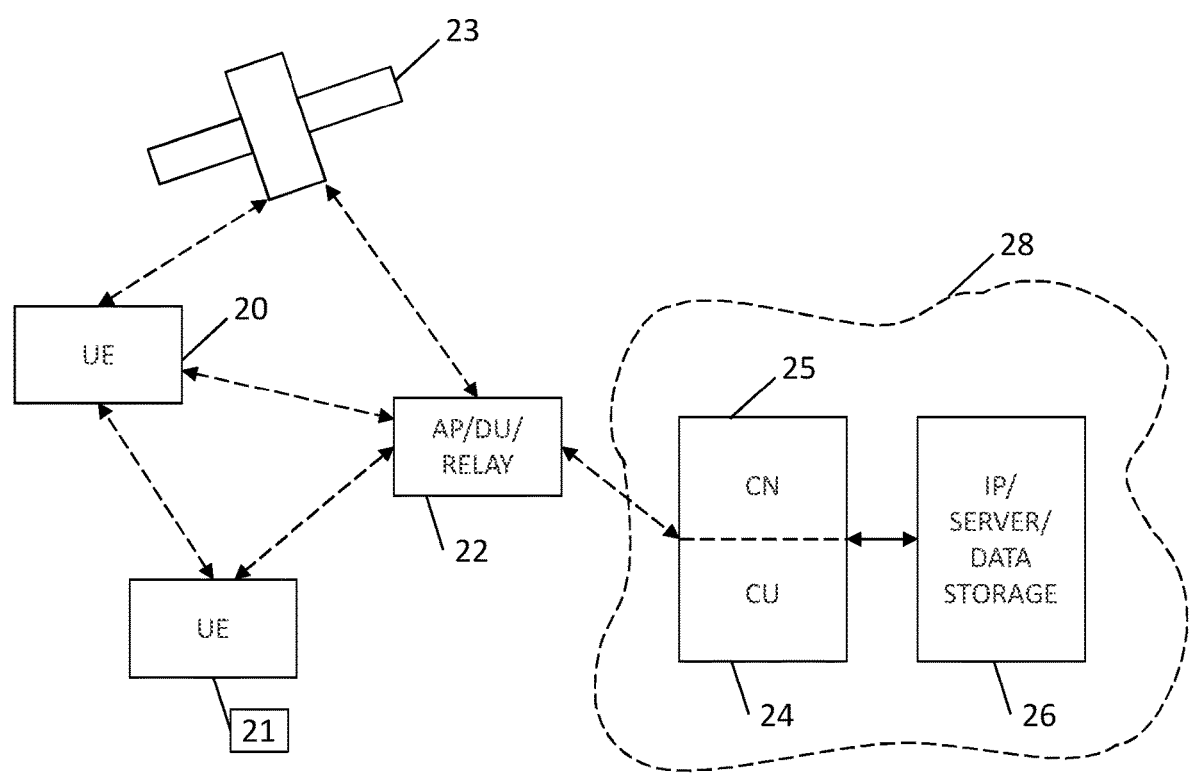
Figure 4:
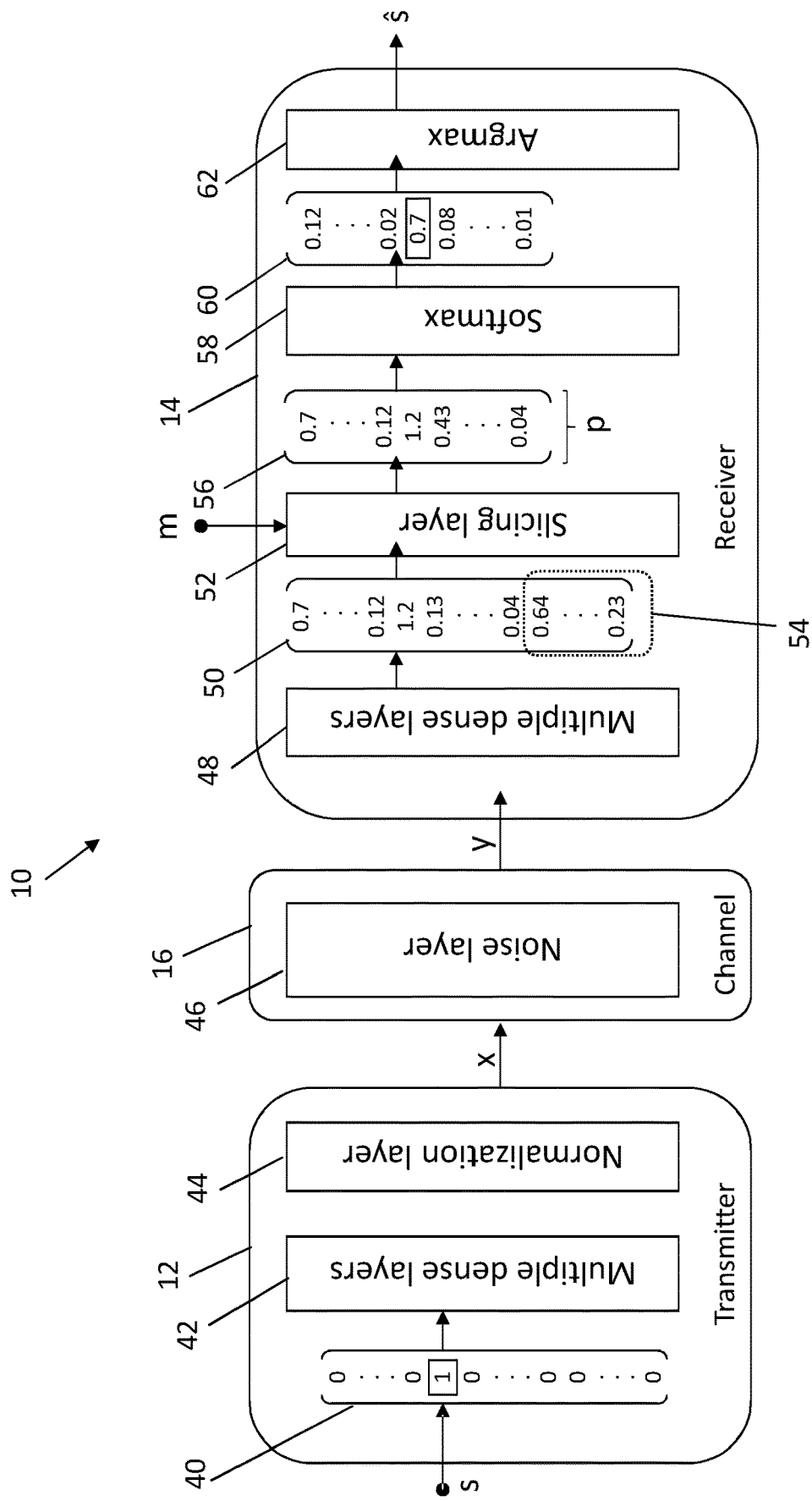
Figure 5:
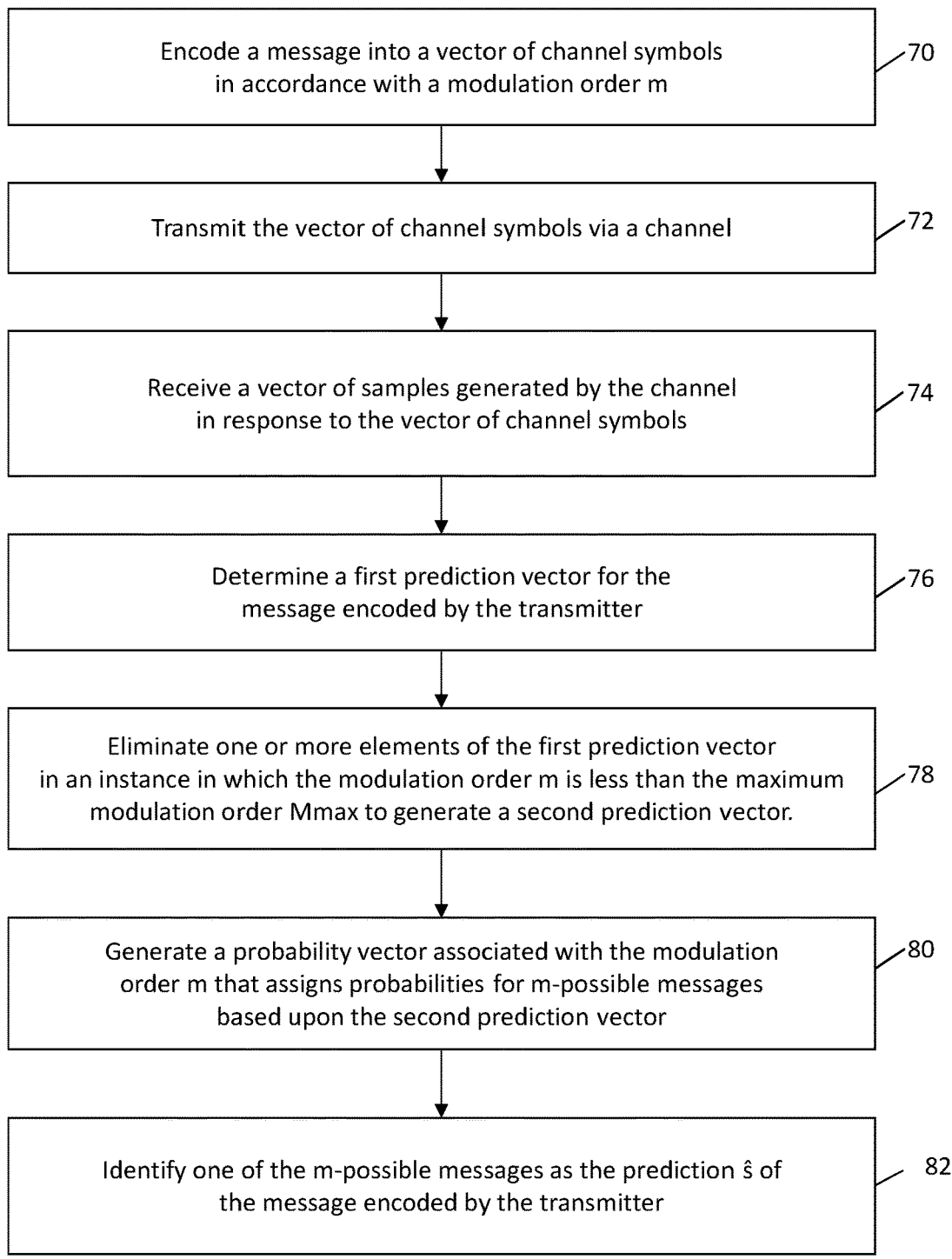
Figure 6:
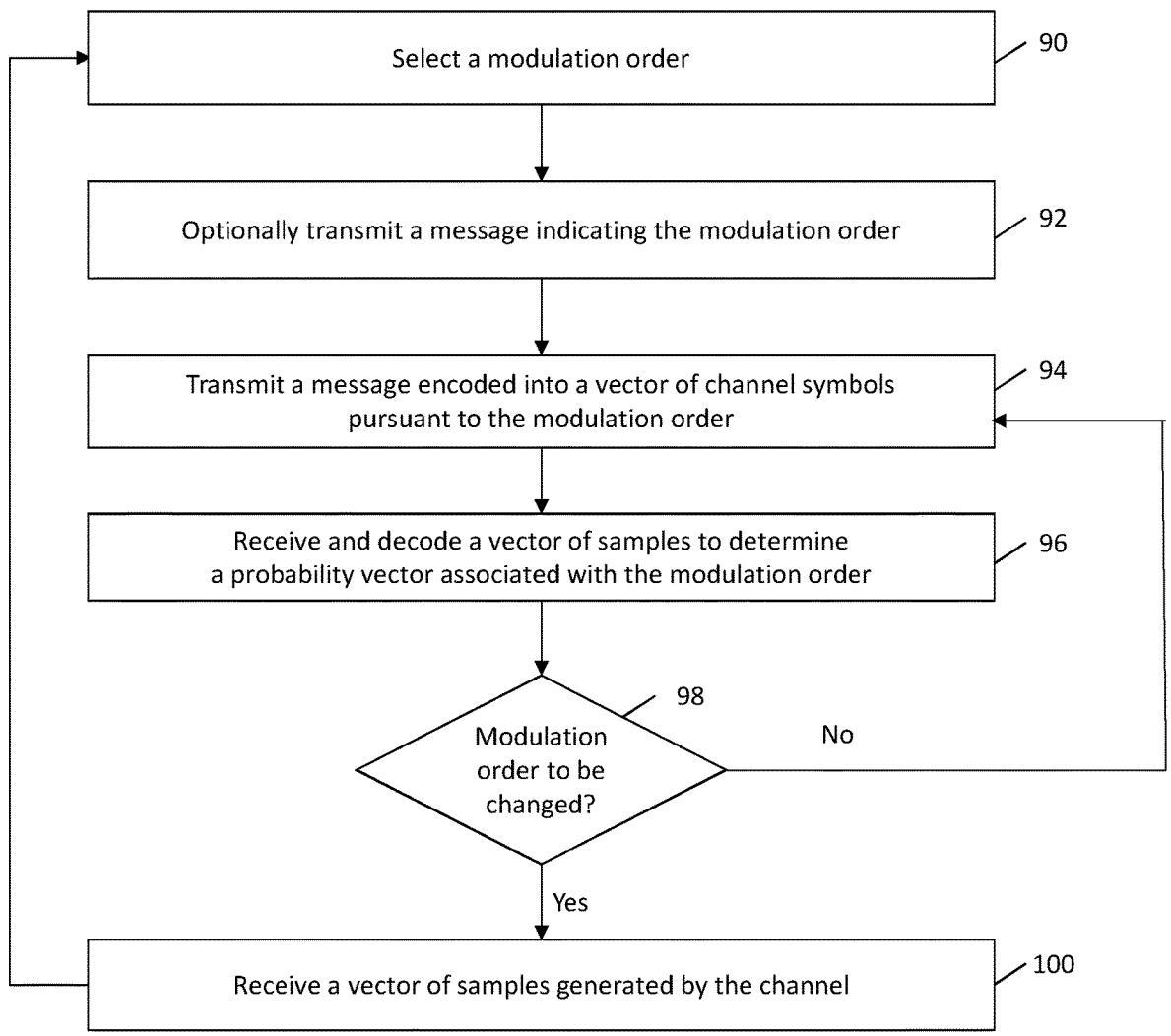
Figure 7:
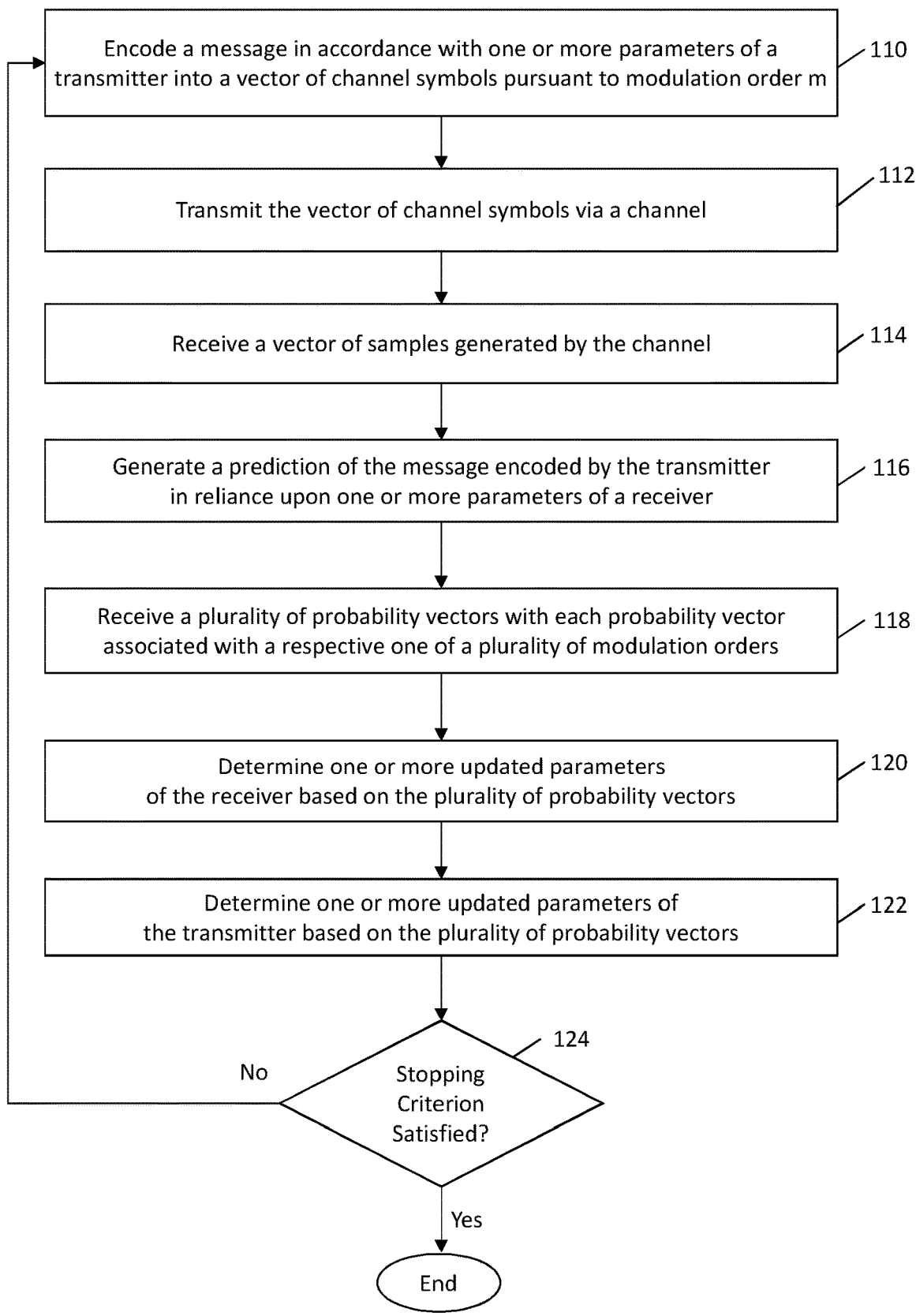

Having thus described certain example embodiments of the present disclosure in general terms, reference will hereinafter be made to the accompanying drawings, which are not necessarily drawn to scale, and wherein:

FIG. 1 is a block diagram of a system including both a transmitter and a receiver configured to communicate via a channel with a configuration apparatus configured to reconfigure the transmitter and the receiver in accordance with an example embodiment;

FIG. 2 is a block diagram of an example communication system in which the system in FIG. 1 may be deployed;

FIG. 3 is a block diagram of an apparatus that may be specifically configured in accordance with an example embodiment of the present disclosure;

FIG. 4 is a more detailed block diagram of a communication system including a transmitter, a channel and a receiver in accordance with an example embodiment of the present disclosure;

FIG. 5 is a flowchart illustrating the operations performed, such as by the apparatus of FIG. 3, in order to transmit messages in accordance with a configurable modulation order in accordance with an example embodiment of the present disclosure;

FIG. 6 is a flowchart illustrating the operations performed, such as by the apparatus of FIG. 3, in order to initiate a change to the modulation order in accordance with an example embodiment of the present disclosure; and FIG. 7 is a flowchart illustrating the operations performed, such as by the apparatus of FIG. 3, in order to train the transmitter and the receiver of the communication system in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

As illustrated in FIG. 1, a system 10 is provided in accordance with an example embodiment that includes both a transmitter 12 and a receiver 14 configured to communicate via a communications channel 16. As described below, the system also includes a configuration apparatus 18 that is configured to determine updated parameters of both the transmitter and the receiver and to correspondingly reconfigure the transmitter and the receiver utilizing the updated parameters so as to enhance symbol timing synchronization therebetween.

The data that is transmitted via the channel 16 between the transmitter 12 and the receiver 14 can be any of a wide variety of data including, but not limited to digital imagery data including video data, audio data as well as data provided by sensors, radars, telescopes and radio receivers. In at least some instances, the transmitter encodes the data prior to communication of the data via the channel and the receiver correspondingly decodes that data. The resulting data received by the receiver may be utilized for a variety of purposes including presentation to a user, storage of the data and/or provision of the data to one or more applications, such as applications that perform statistical inference on the data for various purposes including object recognition, image classification, spectrum sensing, speech transcription and/or prediction or detection of events. Although depicted in FIG. 1 in the form of unidirectional transmission from the transmitter to the receiver, the transmitter and the receiver may be embodied by a device, such as a transceiver or the like, that includes both a transmitter and a receiver, thereby supporting bidirectional communication.

The system 10 of FIG. 1 may be utilized for a variety of applications. As shown in FIG. 2, for example, a communications system may include a plurality of transmitters and a plurality of receivers configured to communicate via respective channels. In this regard, the user equipment may include a transmitter configured to communicate with a receiver of a base station. Conversely, the base station not only includes a receiver, but also includes a transmitter for communicating with a receiver of the user equipment.

By way of example, the system 10 may be deployed within a radio access architecture based on long term evolution advanced (LTE Advanced, LTE-A) or new radio (NR, 5G). However, the system may be deployed in other application including within other communication networks including, for example, a universal mobile telecommunications system (UMTS) radio access network (UTRAN or E-UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

In this regard, FIG. 2 depicts an example of a simplified system architecture only showing some elements and functional entities, all being logical units, whose implementation may differ from what is shown. The connections shown in FIG. 2 are logical connections; the actual physical connections may be different. It is apparent to a person skilled in the art that the system typically comprises also other functions and structures than those shown in FIG. 2.

In the radio access architecture of FIG. 1, user devices 20 and 21 are configured to be in a wireless connection on one or more communication channels in a cell with an access node (such as a NodeB) 22 providing the cell. The physical link from a user device to a NodeB is called the uplink or reverse link and the physical link from the NodeB to the user device is called the downlink or forward link. It should be appreciated that the NodeBs or their functionalities may be implemented by using any node, host, server or access point (AP), etc. entity suitable for such a usage.

A communications system typically comprises more than one NodeB in which case the NodeBs may also be configured to communicate with one another over links, wired or wireless, designed for the purpose. These links may be used for signalling purposes. The NodeB is a computing device configured to control the radio resources of the communication system to which the NodeB is coupled. The NodeB may also be referred to as a base station, an access point or any other type of interfacing device including a relay station capable of operating in a wireless environment. The NodeB includes or is coupled to transceivers. From the transceivers of the NodeB, a connection is provided to an antenna unit that establishes bi-directional radio links to user devices. As such, the transceivers of the NodeB and the transceivers of the user devices may include transmitters 12 and receivers 14 configured to communicate via a channel 16 with the trainable parameters of the transmitters and receivers able to be reconfigured in accordance with an example embodiment. The antenna unit may comprise a plurality of antennas or antenna elements. The NodeB is further connected to core network 25 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Although the apparatuses have been depicted as single entities, different units, processors and/or memory units (not all shown in FIG. 1) may be implemented. Further, the number of reception and/or transmission antennas of the user devices may naturally vary according to a current implementation 5G enables using multiple input-multiple output (MIMO) antennas, many more base stations or nodes than LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require bringing the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), and critical communications (autonomous vehicles, traffic safety, real-time analytics, time-critical control, and healthcare applications).

The communication system is also able to communicate with other networks, such as a public switched telephone network or the Internet 26, or utilize services provided by them. The communication network may also be able to support the usage of cloud services, for example at least part of core network operations may be carried out as a cloud service (this is depicted in FIG. 2 by "cloud" 28). The communication system may also comprise a central control entity, or a like, providing facilities for networks of different operators to cooperate for example in spectrum sharing.

Edge cloud may be brought into a radio access network (RAN) by utilizing network function virtualization (NVF) and software defined networking (SDN). Using an edge cloud may mean access node operations to be carried out, at least partly, in a server, host or node operationally coupled to a remote radio head or base station comprising radio parts.

It is also possible that node operations will be distributed among a plurality of servers, nodes or hosts. Application of cloudRAN architecture enables RAN real time functions being carried out at the RAN side (in a distributed unit, DU 22) and non-real time functions being carried out in a centralized manner (in a centralized unit, CU 24).

It should also be understood that the distribution of labor between core network operations and base station operations may differ from that of the LTE or even be non-existent. Some other technology advancements that may be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 23 in the mega-constellation may cover several satellite-enabled network entities that create on-ground cells. The on-ground cells may be created through an on-ground relay node 22 or by a gNB located on-ground or in a satellite.

The depicted system is only an example of a part of a radio access system in which the system 10 of FIG. 2 may be deployed and in practice, the system may comprise a plurality of NodeBs, the user devices may have an access to a plurality of radio cells and the system may also comprise other apparatuses, such as physical layer relay nodes or other network elements, etc. At least one of the NodeBs may be a Home nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or pico-cells. The NodeBs of FIG. 2 may provide any kind of these cells. A cellular radio system may be implemented as a multilayer network including several kinds of cells. Typically, in multilayer networks, one access node provides one kind of a cell or cells, and thus a plurality of NodeBs are required to provide such a network structure.

For fulfilling the need for improving the deployment and performance of communication systems, the concept of "plug-and-play" NodeBs has been introduced. Typically, a network which is able to use "plug-and-play" Node Bs, includes, in addition to Home NodeBs (HnodeBs), a home node B gateway, or HNB-GW (not shown in FIG. 2). A HNB Gateway (HNB-GW), which is typically installed within an operator's network may aggregate traffic from a large number of HNBs back to a core network. Although FIG. 2 depicts one example communication system in which system 10 of an example embodiment may be deployed, the system of other example embodiments may be deployed in other types of systems, to support communications or otherwise.

The channel 16 may be any of a variety of different types including, for example, a wireless channel, an optical channel or the like and, in some embodiments, may be configured to support multiple orthogonal channels, such as in time, frequency or space, that are utilized in parallel. Regardless of the type of channel, the channel over which the transmitter 12 and the receiver 14 communicate may be a stochastic channel. As such, the channel receives frames transmitted by the transmitter that are comprised of a plurality of symbols. These symbols include a preamble and one or more data symbols. The preamble is typically prepended to the data symbols. In response, the channel generates a plurality of samples that are received by the receiver. The receiver is configured to identify the sample that corresponds to a particular symbol of the corresponding frame, such as the preamble or the first data symbol of the corresponding frame, in order to allow for proper interpretation, e.g., decoding, of the received data.

As also shown in FIG. 1, the system 10 of an example embodiment additionally includes a configuration apparatus 18. The configuration apparatus is configured to determine updated parameters (for the trainable parameters of the transmitter 12 and the receiver 14) based on symbols transmitted via the channel 16 and samples generated by the channel and received by the receiver. The transmitter and the receiver may then be reconfigured based upon the updated parameters.

Although depicted to be separate from the transmitter 12 and the receiver 14 in FIG. 1, the configuration apparatus 18 or a portion thereof may be implemented by one or both of the transmitter and the receiver. For example, the functionality described below in relation to the configuration apparatus may be distributed between the transmitter and the receiver and, in some embodiments, as an additional configuration apparatus. Alternatively, the configuration apparatus may be implemented entirely by the transmitter, or implemented entirely by the receiver. For purposes of illustration, but not of limitation, however, this system 10 of FIG. 1 will be described below in conjunction with a configuration apparatus that is communication with both the transmitter and receiver.

One example of an apparatus 30 that may be configured to function as the configuration apparatus 18 is depicted in FIG. 3. As shown in FIG. 3, the apparatus includes, is associated with or is in communication with processing circuitry 32, a memory 34 and a communication interface 36. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 30 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 32 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 32 may be configured to execute instructions stored in the memory device 34 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 36 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

An example of a communication system 10, such as an auto encoder-based communication system, in accordance with an example embodiment of the present disclosure is depicted in FIG. 4. As shown, the communication system includes a transmitter 12, a channel 16 and a receiver 14. The transmitter receives a message s to be encoded into a vector x of channel symbols for transmission via the channel. During propagation through the channel, the vector of channel symbols is subjected to distortion, such as noise, as indicated by distortion layer 46. As such, the receiver receives a vector y of samples generated by the channel in response to the vector x of channel symbols transmitted by the transmitter. The receiver then decodes the vector y of sample in order to generate a prediction ŝ of the message s encoded by the transmitter.

With reference to the flowchart the FIG. 5 and, more particularly, block 70 of FIG. 5, the transmitter 12 includes means, such as the at least one processor 32, configured to encode a message s into vector x of channel symbols in accordance with a modulation order m. As described below, the communication system 10, such as the transmitter and the receiver 14, is trained to encode and decode messages in accordance with a plurality of modulation orders up to a maximum modulation order $M_{max}$. In operation, both the transmitter and the receiver should be operating in accordance with the same modulation order. However, the communication system of this example embodiment is capable of changing the modulation order at run time, without any re-training, to any of the other modulation orders for which the communication system was previously trained up to the maximum modulation order $M_{max}$. For example, the modulation order which defines the number of different messages capable of being encoded by the transmitter and predicted by the receiver may be changed in response to changes in the channel condition, such as in conjunction with link adaptation algorithms which suggest a communication rate and, as a result, the modulation order, according to the channel state.

In order to encode the message s into a vector x of channel symbols in accordance with the modulation order m, the transmitter 12 of an example embodiment includes an $M_{max}$-dimensional vector in which the element that corresponds to the message being encoded is set to a first value and all other elements are set to a second value, different than the first value. For example, the first value may be 1 and the second value may be 0. In an embodiment in which the communication system transmits messages in accordance with a modulation order m that is less than the maximum modulation order $M_{max}$, the only elements of the $M_{max}$-dimensional vector that are able to be set to the first value of the first m elements, that is, elements 1, 2, . . . m of the $M_{max}$-dimensional vector. All other element of the $M_{max}$-dimensional vector, that is, elements m+1, m+2, . . . $M_{max}$ are set to the second value since a communication system having a modulation order m is designed to transmit no more than m different messages.

Although the embodiment described above employs one-hot encoding which utilizes an $M_{max}$-dimensional vector in which the element that corresponds to the message being encoded is set to a first value and all other elements are set to a second value, different than the first value, the transmitter 12 can be fed in other manners including techniques that do not utilize one-hot encoding. For example, $M_{max}$ different vectors of size L may be provided and each vector may be one-hot encoded. In any event, there are a plurality of possible representations of the input of the transmitter, termed embeddings, that may be employed in conjunction with certain example embodiments.

In an example embodiment depicted in FIG. 4, the transmitter 12 also includes a neural network having a plurality of trainable parameters that are updated as described below. In conjunction with the embodiment of FIG. 4, the neural network of the transmitter is represented by the multiple dense layers 42, e.g., fully connected layers. However, the neural network may additionally or alternatively be represented by other types of layers, such as convolutional or recurrent layers. Additionally, the transmitter of the illustrated embodiment includes a normalization layer 44 configured to normalize the vector x of channel symbols so as to enforces an energy constraint, such as a unit average power per channel symbol. Although the transmitter may be configured in various manners, the transmitter of an example embodiment includes at least one processor 32 operating in accordance with instructions stored by memory 34 in order to receive a message s and to transmit a vector x of channel symbols via a communication interface 36 with the at least one processor, the memory and the communication interface being, for example, of the type shown in and described above in conjunction with FIG. 3. For example, the at least one processor of the transmitter may be configured to define the $M_{max}$-dimensional vector, implement both the neural network and the normalization layer.

Referring now to block 72 of FIG. 5, the transmitter 12 also includes means, such as the communication interface 36, configured to transmit the vector x of channel symbols via the channel 16. As shown in FIG. 4, the channel generally introduces distortion into the signals propagating therealong as represented by the distortion layer 46. Unlike the neural networks embodied by the transmitter and the receiver 14, the distortion layer of the channel is generally unable to be trained.

As shown in block 74 of FIG. 5, the receiver 14, in turn, includes means, such as the communication interface 36, configured to receive a vector y of samples generated by the channel 16 in response to the vector x of channel symbols transmitted by the transmitter 12. The receiver is then configured to process the vector y of samples in order to generate a prediction § of the message encoded by the transmitter. As shown in block 76 of FIG. 5, the receiver of an example embodiment includes means, such as the at least one processor 32, configured to determine a first prediction vector for the message encoded by the transmitter. In this regard, the receiver may include a neural network having a plurality of trainable parameters. In the embodiment of FIG. 4, for example, the neural network of the receiver is represented by the multiple dense layers 48, e.g., fully connected layers, that generate a first prediction vector 50 for the vector 7 of samples received by the receiver. However, the neural network may additionally or alternatively be represented by other types of layers, such as convolutional or recurrent layers. The first prediction vector includes respective element associated with each message that the communication system 10 may encode and decode. As the communication system of the example embodiment is trained to operate in conjunction with a plurality of modulation orders up to a maximum modulation order $M_{max}$, the first prediction vector has $M_{max}$ dimensions with each element of the first prediction vector indicating a likelihood that the message encoded by the transmitter is the message with which the respective element of the first prediction vector is associated.

As shown in block 78 of FIG. 5, the receiver 14 also includes means, such as the at least one processor 32, configured to eliminate one or more elements of the first prediction vector 50 in an instance in which the modulation order m is less than the maximum modulation order $M_{max}$ so as to generate a second prediction vector 56. The second prediction layer of an example embodiment is an m-dimensional vector having m elements. In the illustrated embodiment, the receiver, such as the at least one processor, includes a slicing layer 52. The slicing layer is provided with the modulation order m and in an example embodiment is configured to eliminate one or more elements of the first prediction vector such as by truncating those elements of the first prediction vector that are dimensionally greater than the modulation order m. By way of example, for a first prediction vector having elements designating 1, 2, 3, . . . $M_{max}$, the slicing layer may eliminate one or more elements of the first prediction vector by eliminating elements m+1, m+2 . . . $M_{max}$ of the first prediction vector such that only elements 1, 2, . . . , m remain in the second prediction vector.

As shown in block 80 of FIG. 5, the receiver 14 of an example embodiment additionally includes means, such as at least one processor 32, configured to generate a probability vector p associated with the modulation order m that assigns probabilities pi for m-possible messages $m_i$ encoded by the transmitter 12 based upon the second prediction vector 56. The receiver of an example embodiment includes means, such as the at least one processor, configured to normalize the second prediction vector in order to generate the probability vector p. For example, the receiver may include an activation function, such as a softmax function, configured to normalize the second prediction vector into the probability vector p representing a probability distribution having m probabilities. The normalization of the second prediction vector serves to modify the values of the elements of the second prediction vector such that a resulting probability vector complies with an energy constraint, such as a unit average power per channel symbol.

With reference to the probability vector p, the receiver 14 includes means, such as the at least one processor 32, configured to identify one of the m-possible messages as the prediction ŝ of the message encoded by the transmitter 12. See block 82. For example, the receiver may be configured to identify the message associated with the element of the probability vector p having the greatest probability as the prediction ŝ of the message encoded by the transmitter, such as by applying an argmax function to the probability vector p. As described below, the configuration apparatus 18 also includes means, such as at least one processor 32, configured to determine one or more updated parameters of the receiver 14 and the transmitter.

As noted above, the modulation order of the communication system 10 may be changed at run time, such as during operation of the communication system. Although the modulation order of the communication system may be changed in various manners, one example of the manner in which the modulation order of the communication system is changed is depicted in the flowchart of FIG. 6. In this example embodiment, a modulation order m is initially selected, such as based upon the anticipated channel conditions. See block 90. In an embodiment in which both the transmitter 12 and receiver 14 of the communication system are aware of the modulation order m, the transmitter includes means, such as the communication interface 36, configured to transmit a message s encoded into a vector x of channel symbols pursuant to the modulation order as shown in block 94 and the receiver includes means, such as the communication interface, configured to receive and decode a vector y of samples to determine a probability vector p associated with the modulation order as shown in block 96. By encoding and decoding a message pursuant to modulation order m, the number of different messages that may be encoded and decoded is limited to m possible messages as described above. In embodiments in which the transmitter is aware of the modulation order, but the receiver is unaware of the modulation order, however, such as in instances in which the transmitter is initially configured to operate in accordance with the modulation order m or in an instance in which the transmitter has received instructions to change the modulation order, the transmitter of an example embodiment may optionally include means, such as the communication interface, configured to transmit a message to the receiver indicating the modulation order that is to be utilized as shown in block 92 prior to transmission and reception of the message by the transmitter and receiver, respectively.

In the example embodiment, a determination is made by means, such as by the at least one processor 32 of the transmitter 12, the receiver 14 or the configuration apparatus 18, as to whether the modulation order is be changed. See block 98. This determination may be based upon a variety of factors. For example, the communication system 10 may receive an instruction, such as from a link adaptation algorithm, indicating that the communication rate over the channel 16 is be or has changed which, in turn, brings about a change in the modulation order. Alternatively, the communication system, such as the at least one processor of the transmitter, the receiver or the configuration apparatus, may monitor the channel state and may cause the modulation order to be changed based upon the channel state. Still further, the communication system, such as the at least one processor of the receiver or the configuration apparatus, may evaluate the received messages according to a predefined criterion, such as the block error rate, and may cause the modulation order to be changed in an instance in which the received messages fail to satisfy the predefined criterion.

In an instance in which the modulation order is not changed, the transmitter 12 may continue to transmit a message encoded into a vector x of channel symbols pursuant to the modulation order and the receiver 14 may continue to receive a vector y of samples and to determine a probability vector p associated with the modulation order. However, in an instance in which the modulation order is to be changed, the receiver of an example embodiment includes means, such as at least one processor 32 and/or communication interface 36, configured to provide feedback as shown in block 100 to trigger a change in the modulation order by both the transmitter and the receiver. The feedback provided by the receiver may be provided in various forms. For example, the receiver may be configured to transmit a message specifying the specific modulation order, the receiver may be configured to transmit a message indicating an increase or decrease in the modulation order or the receiver may be configured to transmit an ACK/NACK (acknowledgement/negative acknowledgement) message in which the receiver indicates whether the message previously encoded by the transmitter has been properly received or not. As such, the modulation order of the communications system 10 can be changed at run time, that is, during operation, to any modulation order up to the maximum modulation order $M_{max}$ without having to re-train the transmitter and receiver and without having to provide a different communication system to support the different modulation order.

The neural networks of the transmitter 12 and receiver 14 are configured to be trained in order to operate in accordance with a plurality of different modulation orders up to the maximum modulation order $M_{max}$. In this regard, the transmitter and the receiver, such as the neural networks of the transmitter and receiver, may be trained utilizing one or more updated parameters determined by the communication system 10. The communication system 10 may be trained following deployment, or the communication system may be trained in a simulation environment using a model of the channel that may be predefined, such as to be differentiable and to be the same or a close approximation of the actual communication channel via which the transmitter and receiver will subsequently communicate following deployment.

With reference now to FIG. 7, the transmitter 12 includes means, such as the at least one processor 32 of the transmitter, configured to encode a message s in accordance with one or more parameters of the transmitter. See block 110. As such, the message is encoded into a vector x of channel symbols pursuant to a modulation order m defining the number (m) of possible messages. The transmitter also includes means, such as the at least one processor and/or the communication interface 36 of the transmitter, configured to transmit the vector x of channel symbols via the channel 16 and the receiver includes means, such as the at least one processor and/or the communication interface of the receiver, correspondingly configured to receive a vector y of samples generated by the channel and to generate a prediction ŝ of the message encoded by the transmitter in reliance upon the one or more trainable parameters of the receiver. See blocks 112-116 of FIG. 7. In an example embodiment, the configuration apparatus 18 includes means, such as the at least one processor, configured to determine the updated parameters of the transmitter and receiver by receiving a plurality of probability vectors associated with different respective modulation orders, one example of which is described below. See block 118 of FIG. 7.

In an example embodiment, the parameters of the transmitter 12 and the receiver 14 are trained by first initializing the parameters of the transmitter and receiver, such as the weights of the neural networks of the transmitter and receiver. For example, the parameters may be initialized in a random manner. A plurality of sample messages are then encoded for transmission via the channel 16 prior to subsequently being decoded with the results of the decoding being utilized to direct the training of the transmitter and receiver. In an example embodiment and for a communication system 10 configured to operate in accordance with any one of a plurality of modulation orders m up to a maximum modulation order $M_{max}$, In an instance in B is the batch size, B modulation orders $m^{(i)}$ are sampled from the set M of modulation orders according to which the communication system can operate as follows $\{m^{(i)} \in M\}_{i=1,\ldots,B}$ and B messages $s^{(i)}$ are sampled from the set $S_m$ of messages corresponding to the modulation order m∈M as defined by $\{s^{(i)} \in S_{m(i)}\}_{i=1,\ldots,B}$. The communication system then utilizes the B messages in the B modulation orders to generate a plurality of probability vectors $p^{(i)}$, one of which is associated with each of the modulation orders i that is sampled. In this regard, the plurality of the probability vectors $p^{(i)}$ that are generated may be defined as: $\{p^{(i)} \in P_{m(i)}\}_{i=1,\ldots,B}$. It is noted that in the generation of the probability vectors, the slicing width of the slicing layer 52 of the receiver 14 may be adjusted during each pass in order to match a modulation order of the respective pass.

As shown in block 118 of FIG. 7, the configuration apparatus 18 includes means, such as the at least one processor 32, configured to receive the plurality of probability vectors $p^{(i)}$ with each probability vector associated with a respective one of the plurality of modulation orders $m^{(i)}$. As shown in block 120, the configuration apparatus also includes means, such as the at least one processor, configured to determine one or more updated parameters of the receiver based on the plurality of probability vectors and, as shown in block 122, means, such as the at least one processor, to similarly determine one or more updated parameters of the transmitter based on the plurality of probability vectors. In this regard, the determination of one or more parameters of the receiver and the transmitter may include the determination of one or more weights of the neural networks embodied by the receiver and the transmitter. In an example embodiment, the updated parameters are determined by determining a loss function, such as the categorical cross-entropy loss, and then performing a gradient descent on the loss function, e.g., the categorical cross-entropy loss. In an example embodiment, the at least one processor is configured to determine the categorical cross-entropy loss as:

$$L(\theta_T, \theta_R) = \frac{1}{B}\sum_{i \in B} -\log(p_{S_i}^{(i)})$$

wherein $\theta_T$ and $\theta_R$ are the parameters to be updated for the transmitter and the receiver, respectively. The configuration apparatus, such as the at least one processor, may be configured to perform any of a variety of gradient descents on the loss function, e.g., the categorical cross-entropy loss, such as a stochastic gradient descent (SGD) or a variant of the SGD, such as adaptive moment estimation (ADAM), root mean square propagation (RMSprop) or Momentum algorithms. The batch size B and the type of SGD may be selected as optimization parameters. Based upon the updated parameters of the transmitter and the receiver that have been determined, the parameters of the transmitter and the receiver may be modified, such as by correspondingly modifying the weights of the neural networks of the transmitter and the receiver.

In some embodiments, this process for determining updated parameters for the transmitter 12 and the receiver 14 may be repeated. For example, a stopping criterion may be defined and, after having determined the updated parameters of the transmitter and the receiver, the configuration apparatus 18 of this example embodiment includes means, such as the at least one processor 32, configured to determine whether the stopping criterion has been satisfied. See block 124 of FIG. 7. If the stopping criterion has been satisfied, the process of updating the parameters of the transmitter and the receiver is concluded. However, if the stopping criterion has not been satisfied, this process of updating the parameters of the transmitter and the receiver is repeated.

The stopping criterion may be defined in various manners. For example, the stopping criterion may be the completion of a predefined number of iterations of the process or the variation in the amount by which the trainable parameters are modified from the prior iteration to the current iteration being less than a predefined amount. Alternatively, the stopping criterion may be defined by a related performance metric, such as the block error rate. In this regard, the configuration apparatus 18, such as the at least one processor 32, is configured to determine a performance metric associated with the encoding and decoding of a message. In an instance in which the performance metric that is determined satisfies a predefined performance threshold, the stopping criterion is satisfied and the process of updating the parameters of the transmitter and the receiver is concluded. Alternatively, in an instance in which the performance metric that is determined fails to satisfy the predefined performance threshold, the stopping criterion is not satisfied and the process of updating the parameters of the transmitter and the receiver continues with the performance metric being determined and compared to the predefined performance threshold following each iteration.

By training the communication system 10 including the transmitter 12 and the receiver 14 in the manner described above in which sample messages of a plurality of different sample modulation orders are transmitted by the communication system 10, and probability vectors associated with the plurality of different modulation orders are determined, the communication system including both the transmitter and the receiver are configured to operate in accordance with a plurality of different modulation orders up to the maximum modulation order $M_{max}$. Thus, during subsequent operation of the communication system, the communication system may be configured to change the modulation order of the transmitter and the receiver, such as due to a change in the channel conditions, without having to re-train the communication system and without having to employ a different communication system to support the different modulation order. Thus, the change in modulation order may occur at run time, such as during operation of the communication system, without needing to further train the communication system at the time at which the modulation order is changed. Thus, the resulting communication system may be utilized in a wider variety of applications, including those in which the communication rate and, thus, the modulation order is adjusted, such as according to the channel state, such as by link adaptation algorithms or otherwise, while the communication system is in operation.

FIGS. 5-7 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, in some embodiments in which the channel 16 is subject to interference, the training of the end-to-end system 10 may also permit the system to be optimized while taking into account the interference, thereby reducing the otherwise deleterious impact of the interference. As another example, while the foregoing embodiment have employed a single transmitter 12, the channel of other embodiments is configured to support the concurrent transmissions from multiple transmitters and/or multiple sources of data with the training of the end-to-end system permitting the concurrent transmission to be optimized.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A system comprising:
a transmitter configured to encode a message into a vector of channel symbols for transmission via a channel, wherein the transmitter is configured to encode the message in accordance with a modulation order m that is adjustable up to a maximum modulation order $M_{max}$; and
a receiver configured to receive a vector of samples generated by the channel in response to the vector of channel symbols transmitted by the transmitter, wherein the receiver is configured to determine a first prediction vector for the message encoded by the transmitter, and wherein the receiver comprises a slicing layer configured to eliminate one or more elements of the first prediction vector in an instance in which the modulation order m is less than the maximum modulation order $M_{max}$ so as to generate a second prediction vector tailored to the modulation order from which a prediction of the message encoded by the transmitter is identified.

2. A system according to claim 1 wherein the receiver is further configured to generate a probability vector associated with the modulation order m, wherein the probability vector assigns probabilities for m-possible messages based upon the second prediction vector, wherein the system further comprises at least one processor configured to determine one or more updated parameters of the receiver and of the transmitter, wherein the updated parameters of the receiver and of the transmitter are based on the probability vector for each of a plurality of modulation orders, and wherein the transmitter and receiver are reconfigured based upon the one or more updated parameters of the transmitter and receiver, respectively.

3. A system according to claim 2 wherein the receiver further comprises an activation function configured to normalize the second prediction vector into the probability vector representing a probability distribution having m probabilities.

4. A system according to claim 2 wherein at least one of the transmitter or the receiver comprises a neural network having a plurality of trainable parameters that are updated by determinations of the at least one processor.

5. A system according to claim 1 wherein the transmitter is configured to encode a message and the receiver is configured to predict the message encoded by the transmitter in accordance with a plurality of modulation orders, and wherein a respective modulation order defines a number of different messages capable of being encoded by the transmitter and predicted by the receiver.

6. A system according to claim 5 wherein the transmitter is configured to encode the message as an $M_{max}$-dimensional vector having an element that corresponds to the message being encoded set to a first value and all other elements set to a second value, different than the first value.

7. A system according to claim 6 wherein the transmitter is configured to encode a message and the receiver is configured to predict the message encoded by the transmitter in accordance with a respective modulation order m, wherein only elements 1, 2, . . . m of the $M_{max}$-dimensional vector are able to be set to the first value, and wherein elements m+1, m+2, . . . $M_{max}$ of the $M_{max}$-dimensional vector are set to the second value.

8. A system according to claim 1 wherein the slicing layer of the receiver is configured to eliminate elements of the first prediction vector such that the second prediction vector has a number of elements that equals the modulation order.

9. A system according to claim 1 wherein the slicing layer of the receiver has a variable width that is dependent upon the modulation order, wherein the width of the slicing layer defines a number of elements of the second prediction vector.

10. A system according to claim 1 wherein the transmitter is further configured to change the modulation order based upon feedback provided by the receiver.

11. A system according to claim 1 wherein the transmitter is further configured to provide a message to the receiver to inform the receiver of the modulation order.

12. A receiver comprising:
a communication interface configured to receive a vector of samples generated by a channel in response to a vector of channel symbols transmitted by a transmitter; and
at least one processor configured to determine a first prediction vector for a message encoded by the transmitter into the vector of channel symbols in accordance with a modulation order m that is adjustable up to a maximum modulation order $M_{max}$, wherein the at least one processor comprises a slicing layer configured to eliminate one or more elements of the first prediction vector in an instance in which the modulation order m is less than the maximum modulation order $M_{max}$ so as to generate a second prediction vector tailored to the modulation order from which a prediction of the message encoded by the transmitter is identified.

13. A receiver according to claim 12 wherein the at least one processor is further configured to generate a probability vector associated with the modulation order m, wherein the probability vector assigns probabilities for m-possible messages based upon the second prediction vector, wherein the at least one processor is further configured to determine one or more updated parameters of the receiver, wherein the updated parameters of the receiver are based on the probability vector for each of a plurality of modulation orders, and wherein the receiver is reconfigured based upon the one or more updated parameters.

14. A receiver according to claim 13 wherein the at least one processor comprises an activation function configured to normalize the second prediction vector into the probability vector representing a probability distribution having m probabilities.

15. A receiver according to claim 13 wherein the at least one processor comprises a neural network having a plurality of trainable parameters that are updated by determinations of the at least one processor.

16. A receiver according to claim 12 wherein the receiver is configured to predict the message encoded by the transmitter in accordance with a plurality of modulation orders, and wherein a respective modulation order defines a number of different messages capable of being encoded by the transmitter and predicted by the receiver.

17. A receiver according to claim 12 wherein the slicing layer is configured to eliminate elements of the first prediction vector such that the second prediction vector has a number of elements that equals the modulation order.

18. A receiver according to claim 12 wherein the slicing layer has a variable width that is dependent upon the modulation order, wherein the width of the slicing layer defines a number of elements of the second prediction vector.

19. An apparatus comprising:
at least one processor; and
at least one memory including computer program code,
the at least one memory and the computer program code configured to, with the at least one processor, cause the apparatus at least to perform:
for a plurality of messages transmitted by a communications system configured to have a plurality of modulation orders, receive a plurality of probability vectors with each probability vector associated with a respective one of the plurality of modulation orders, wherein the probability vector assigns probabilities to a vector of samples that identifies the probability that a respective message corresponds to the vector of samples;
determine one or more updated parameters of a receiver of the communications system that receives the vector of samples generated by a channel in response to a vector of channel symbols transmitted by a transmitter of the communications system, wherein the updated parameters of the receiver are based on the plurality of probability vectors; and determine one or more updated parameters of the transmitter that provides the vector of channel symbols for transmission over the channel, wherein the updated parameters of the transmitter are based on the plurality of probability vectors.

20. An apparatus according to claim 19 wherein the at least one memory and the computer program code are further configured to, with the at least one processor, cause the apparatus to repeatedly receive an additional plurality of probability vectors for a different plurality of messages transmitted by the communications system and to repeatedly determine the one or more updated parameters of the receiver and the transmitter based on the additional plurality of probability vectors.

21. An apparatus according to claim 20 wherein the at least one memory and the computer program code are further configured to, with the at least one processor, cause the apparatus to evaluate a stopping criterion and to continue to repeatedly receive the additional plurality of probability vectors for the different plurality of messages transmitted by the communications system and to repeatedly determine the one or more updated parameters of the receiver and the transmitter based on the additional plurality of probability vectors until the stopping criterion is satisfied.

22. An apparatus according to claim 19 wherein the at least one memory and the computer program code are further configured to, with the at least one processor, cause the apparatus to determine a loss function based on the plurality of probability vectors and to perform a gradient descent on the loss function, wherein the at least one memory and the computer program code are also configured to, with the at least one processor, cause the apparatus to determine one or more updated parameters of the receiver and the transmitter based on the gradient descent.

23. An apparatus according to claim 19 wherein the modulation order defines a number of different messages capable of being encoded by the transmitter and predicted by the receiver, and wherein the plurality of modulation orders define different numbers of messages capable of being encoded by the transmitter and predicted by the receiver.

24. A method comprising:
for a plurality of messages transmitted by a communications system configured to have a plurality of modulation orders, receiving a plurality of probability vectors with each probability vector associated with a respective one of the plurality of modulation orders, wherein the probability vector assigns probabilities to a vector of samples that identifies the probability that a respective message corresponds to the vector of samples;
determining one or more updated parameters of a receiver of the communications system that receives the vector of samples generated by a channel in response to a vector of channel symbols transmitted by a transmitter of the communications system, wherein the updated parameters of the receiver are based on the plurality of probability vectors; and
determining one or more updated parameters of the transmitter that provides the vector of channel symbols for transmission over the channel, wherein the updated parameters of the transmitter are based on the plurality of probability vectors.

25. A method according to claim 24 further comprising repeatedly receiving an additional plurality of probability vectors for a different plurality of messages transmitted by the communications system and repeatedly determining the one or more updated parameters of the receiver and the transmitter based on the additional plurality of probability vectors.

26. A method according to claim 25 further comprising evaluating a stopping criterion and continuing to repeatedly receive the additional plurality of probability vectors for the different plurality of messages transmitted by the communications system and to repeatedly determine the one or more updated parameters of the receiver and the transmitter based on the additional plurality of probability vectors until the stopping criterion is satisfied.

27. A method according to claim 24 further comprising determining a loss function based on the plurality of probability vectors and performing a gradient descent on the loss function, wherein determining one or more updated parameters of the receiver and the transmitter comprises determining one or more updated parameters of the receiver and the transmitter based on the gradient descent.

28. A method according to claim 24 wherein the modulation order defines a number of different messages capable of being encoded by the transmitter and predicted by the receiver, and wherein the plurality of modulation orders define different numbers of messages capable of being encoded by the transmitter and predicted by the receiver.

* * * * *